US012565375B2

(12) United States Patent
Yee et al.

(10) Patent No.: US 12,565,375 B2
(45) Date of Patent: Mar. 3, 2026

(54) SUBSTRATE LOADING STATION

(71) Applicant: Samsung Display Co., Ltd., Yongin-si (KR)

(72) Inventors: Dong-Su Yee, Yongin-si (KR); Kihyun Kim, Yongin-si (KR); Yong-Kyun Sim, Yongin-si (KR); Jiyoung Wang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 117 days.

(21) Appl. No.: 18/188,271

(22) Filed: Mar. 22, 2023

(65) Prior Publication Data

US 2023/0382631 A1 Nov. 30, 2023

(30) Foreign Application Priority Data

May 30, 2022 (KR) ........................ 10-2022-0065973

(51) Int. Cl.
*B65D 85/48* (2006.01)
*B08B 3/04* (2006.01)
*B65D 81/05* (2006.01)

(52) U.S. Cl.
CPC ................ *B65D 85/48* (2013.01); *B08B 3/04* (2013.01); *B65D 81/05* (2013.01); *B65D 2581/05* (2013.01)

(58) Field of Classification Search
CPC .... B65D 85/48; B65D 81/05; B65D 2581/05; B08B 3/04
USPC ....................... 211/41.18; 414/935, 937, 938
See application file for complete search history.

(56) References Cited

U.S. PATENT DOCUMENTS 4,993,559 A * 2/1991 Cota ................. H01L 21/67313 211/41.18
5,887,718 A * 3/1999 Oslin ..................... B65D 85/02 211/23
6,318,389 B1 * 11/2001 Schmidt ............ H01L 21/67316 134/201
7,694,690 B2 * 4/2010 Yen ......................... B08B 3/044 211/41.18

(Continued)

FOREIGN PATENT DOCUMENTS

KR 10-2004-0003909 A 1/2004
KR 10-2011-0061937 A 6/2011

(Continued)

*Primary Examiner* — Orlando E Aviles
*Assistant Examiner* — Jenine Pagan
(74) *Attorney, Agent, or Firm* — Womble Bond Dickinson (US) LLP

(57) ABSTRACT

A substrate loading station includes: a first holding portion having a first holding groove defined in a first surface thereof; and a second holding portion facing the first holding portion and configured to hold a window substrate together with the first holding portion. The first surface of the first holding portion faces the second holding portion, and the first holding groove includes: a first groove extending from the first surface toward a second surface of the first holding portion, which is opposite to the first surface, along a first direction; and a second groove extending from an end of the first groove toward both sides of the first holding portion, which are opposite to each other in a second direction crossing the first direction.

19 Claims, 12 Drawing Sheets

(56) References Cited

U.S. PATENT DOCUMENTS

| | | | | |
|---|---|---|---|---|
| 8,195,064 | B2 * | 6/2012 | Dickerson | G03G 15/0896 399/114 |
| 8,800,774 | B2 * | 8/2014 | Bonora | B65G 65/00 206/832 |
| 9,502,274 | B2 | 11/2016 | Hong et al. | |
| 2016/0379859 | A1 * | 12/2016 | Ogitsu | C23C 16/4581 211/41.18 |

FOREIGN PATENT DOCUMENTS

| | | | |
|---|---|---|---|
| KR | 10-1299555 | B1 | 8/2013 |
| KR | 10-2013-0130157 | A | 12/2013 |
| KR | 10-2015-0030025 | A | 3/2015 |
| KR | 10-1605472 | B1 | 3/2016 |

* cited by examiner

SUBSTRATE LOADING STATION

CROSS-REFERENCE TO RELATED APPLICATION

This application claims priority to and the benefit of Korean Patent Application No. 10-2022-0065973, filed on May 30, 2022, in the Korean Intellectual Property Office, the entire content of which is hereby incorporated herein by reference.

BACKGROUND

1. Field

Aspects of embodiments of the present disclosure relate to a substrate loading station.

2. Description of the Related Art

Generally, a display device includes a display panel in which a plurality of elements are arranged. When the display panel is manufactured, various layers, such as a metal thin layer, an inorganic layer, etc., are formed on a substrate to form the elements.

A substrate processing system is used to form the metal thin layer and the inorganic layer on the substrate of the display panel. The substrate processing system includes a cassette for accommodating the substrate, a transfer device for transferring the substrate from the cassette, and a substrate processing device for receiving the substrate from the transfer device and for performing a substrate processing process on the substrate to form the metal thin layer and the inorganic layer.

A cleaning process is performed to remove contaminants generated on the substrate during a previous process before a subsequent process is carried out. The cleaning process is performed after the substrate is held to (e.g., is attached to or held by) a holding part of a substrate loading station.

SUMMARY

Embodiments of the present disclosure provide a substrate loading station configured to prevent or avoid damage to a substrate held thereto.

According to an embodiment of the present disclosure, a substrate loading station includes: a first holding portion having a first holding groove defined in a first surface thereof; and a second holding portion facing the first holding portion and configured to hold a window substrate together with the first holding portion. The first surface of the first holding portion faces the second holding portion, and the first holding groove includes: a first groove extending from the first surface toward a second surface of the first holding portion, which is opposite to the first surface, along a first direction; and a second groove extending from an end of the first groove toward both sides of the first holding portion, which are opposite to each other in a second direction crossing the first direction.

The first groove may have a width in the second direction decreasing as a distance from the second surface decreases.

The first holding groove may further include a plurality of third grooves extending from ends of the second groove extending in the second direction toward the second surface along the first direction.

The third grooves may be configured to accommodate a cleaning solution used to clean the window substrate.

The first holding portion may have inner inclined surfaces facing each other, and the inner inclined surfaces may be symmetrical with respect to each other in the second direction and may define the first groove between the first surface and the second surface.

The inner inclined surfaces may be inclined at an obtuse angle with respect to the first surface, and boundary surfaces between the first surface and the inner inclined surfaces may have a curved surface.

The first holding portion may have a first bottom surface closer to the second surface than the inner inclined surfaces are, may define the second groove extending in the second direction, and may be exposed through the first groove.

The first bottom surface may have a curved surface convex to the first groove.

The first holding portion may have second bottom surfaces recessed from both sides of the first bottom surface, which are opposite to each other in the second direction, toward the second surface to define the third grooves.

The substrate loading station may further include tunnel surfaces extending from the inner inclined surfaces toward the both sides of the first holding portion to define the second groove, and boundary surfaces between the inner inclined surfaces and the tunnel surfaces may have a curved surface.

The second holding portion may have a second holding groove defined in a first surface thereof facing the first holding portion.

The second holding groove may have a same shape as a shape of the first holding groove and may be symmetrical with the first holding groove.

The first holding groove and the second holding groove may be configured to receive both side surfaces of the window substrate, which are opposite to each other in the first direction.

The first and second holding portions may respectively define the first and second holding grooves and may be configured such that corners of the both side surfaces of the window substrate do not contact inner surfaces of the first and second holding portions.

The substrate loading station may further include: a first support portion; a first cover portion on the first support portion; a second support portion; and a second cover portion on the second support portion. The first holding portion may be between the first support portion and the first cover portion, and the second holding portion may be between the second support portion and the second cover portion.

The substrate loading station may further include: a third support portion below the first and second supporter portions with respect to a third direction crossing a plane defined by the first and second directions; and a third holding portion below the first and second holding portions and in the third support portion. A third holding groove defined in the third holding portion in the third direction may be configured to receive a lower portion of the window substrate.

The third holding groove may have a same shape as the first holding groove.

According to another embodiment of the present disclosure, a substrate loading station includes: a first holding portion; and a second holding portion facing the first holding portion and configured to hold a window substrate together with the first holding portion. The first holding portion has a first holding groove defined in a first surface thereof facing the second holding portion, and the first holding groove includes: a first groove extending from the first surface toward a second surface of the first holding portion, which is opposite to the first surface, along a first direction; a second groove extending from an end of the first groove to both sides of the first holding portion, which are opposite to each other in a second direction crossing the first direction; and a plurality of third grooves extending from ends of the second groove extending in the second direction toward the second surface along the first direction.

The first holding portion may have a first bottom surface defining the second groove extending in the second direction and exposed through the first groove, and the first bottom surface may have a curved surface convex to the first groove.

The first holding portion may further include: inner inclined surfaces facing each other, symmetrical with respect to each other in the second direction, and defining the first groove between the first surface and the second surface; and tunnel surfaces extending from the inner inclined surfaces toward the both sides of the first holding portion to define the second groove. Boundary surfaces between the inner inclined surfaces and the tunnel surfaces may have a curved surface.

According to the above-described embodiments, corners of both side surfaces of a substrate do not contact inner surfaces of the holding portions, and thus, the corners of the substrate are not damaged due to the impacts or friction with the holding portions. In addition, any cleaning solution remaining after the cleaning of the substrate is accommodated in the third grooves of the holding grooves, and thus, foreign substances do not adhere to a surface of the substrate.

BRIEF DESCRIPTION OF THE DRAWINGS

The above and other aspects and features of the present disclosure will become readily apparent by reference to the following detailed description when considered in conjunction with the accompanying drawings, in which.

DETAILED DESCRIPTION

Figure 1:
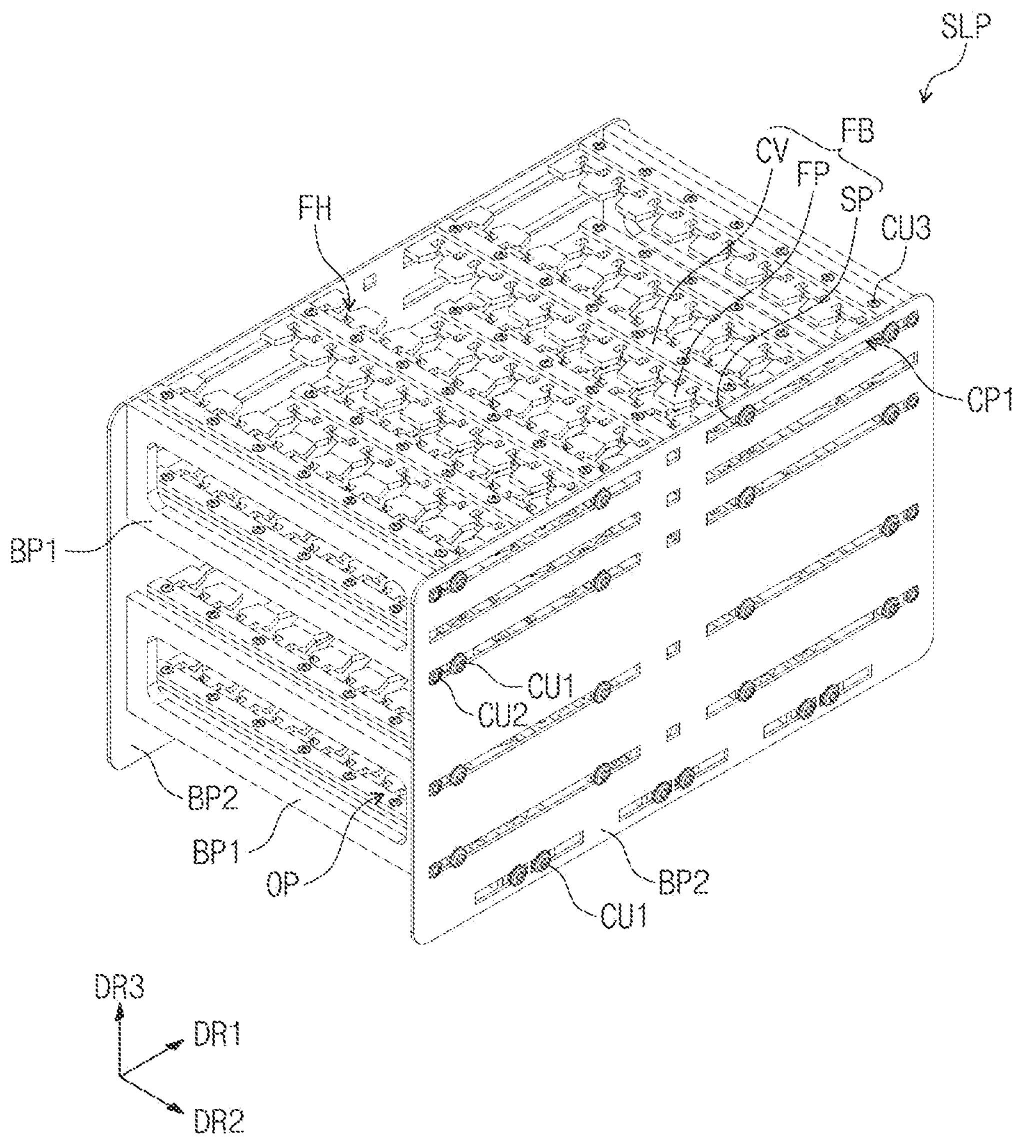
FIG. 1 is a perspective view of a substrate loading station according to an embodiment of the present disclosure.

Aspects and features of the present disclosure, and methods of accomplishing the same, may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be through and complete and will fully convey the present disclosure to those skilled in the art. The present disclosure will only be defined by the appended claims and their equivalents.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Embodiments described in the disclosure are described with reference to plan views and cross-sectional views that are ideal schematic diagrams. Accordingly, shapes of the views may vary depending on manufacturing technologies and/or tolerances. Thus, embodiments are not limited to shown specific forms and include variations in form produced according to manufacturing processes. Therefore, regions illustrated in the drawings are examples, and the shapes of the regions illustrated in the drawings are intended to illustrate the specific shapes of the regions of elements and do not limit the scope of the present disclosure.

Hereinafter, embodiments of the present disclosure will be described with reference to accompanying drawings.

FIG. 1 is a perspective view of a substrate loading station SLP according to an embodiment of the present disclosure.

Referring to FIG. 1, the substrate loading station SLP may include a plurality of supporters (e.g., supports) FB, a plurality of first sidewall portions BP1, a plurality of second sidewall portions BP2, and a plurality of coupling units CU1, CU2, and CU3.

The first sidewall portions BP1 may face each other in a first direction DR1. The second sidewall portions BP2 may face each other in a second direction DR2 crossing the first direction DR1. Hereinafter, a direction substantially perpendicular to a plane defined by the first and second directions DR1 and DR2 will be referred to as a third direction DR3. In addition, in the present disclosure, the expression "when viewed in a plane" may mean a state of being viewed in the third direction DR3.

The first sidewall portions BP1 may have a quadrangular frame shape when viewed in the first direction DR1. Two first sidewall portions BP1 may be arranged in the third direction DR3 and may face each other in the first direction DR1, however, this is merely an example. According to an embodiment, three or more first sidewall portions BP1 may be arranged in the third direction DR3. Openings OP may be respectively defined through the first sidewall portions BP1 to define the frame shape.

The second sidewall portions BP2 may include a plane (e.g., a surface) defined by the first and third directions DR1 and DR3. The second sidewall portions BP2 may be provided with a plurality of first coupling openings CP1 defined therethrough. The first sidewall portions BP1 may be disposed between the second sidewall portions BP2 and may be connected to the second sidewall portions BP2.

The supporters FB may be disposed between the first sidewall portions BP1 and between the second sidewall portions BP2. The supporters FB may extend in the second direction DR2 and may be arranged in (e.g., may be adjacent to each other in) the first direction DR1. The supporters FB may be connected to the second sidewall portions BP2. Opposite ends of each of the supporters FB in the second direction DR2 may be connected to the second sidewall portions BP2.

Each of the supporters FB may include a support portion SP, a cover portion CV, and a holding portion FP. The support portions SP may extend in the second direction DR2 and may be arranged in the first direction DR1. The holding portions FP may be disposed between the support portions SP and the cover portions CV. The holding portions FP may face each other in the first direction DR1. The above-mentioned arrangement state of the holding portions FP may be defined as (or referred to as) a horizontal arrangement state. Holding grooves FH may be defined through one surface of each of the holding portions FP facing each other. The holding grooves FH will be described in more detail later. The holding grooves FH may be arranged in the second direction DR2 in each of the holding portions FP.

The coupling units CU1, CU2, and CU3 may include a plurality of first coupling units CU1, a plurality of second coupling units CU2, and a plurality of third coupling units CU3. The supporters FB may be connected to the second sidewall portions BP2 by the first coupling units CU1. The opposite ends of the supporters FB in the second direction DR2 may be connected to the second sidewall portions BP2 by the first coupling units CU1.

The first sidewall portions BP1 may be connected to the second sidewall portions BP2 by the second coupling units CU2. Opposite ends of each of the first sidewall portions BP1 in the second direction DR2 may be connected to the second sidewall portions BP2 by the second coupling units CU2. The first and second coupling units CU1 and CU2 may be connected to the supporters FB and the first sidewall portions BP1 via the first coupling openings CP1 defined through (e.g., extending through) the second sidewall portions BP2.

Each of the third coupling units CU3 may connect the support portion SP, the cover portion CV, and the holding portion FP of each of the supporters FB. This structure will be described in more detail later.

Figure 2:
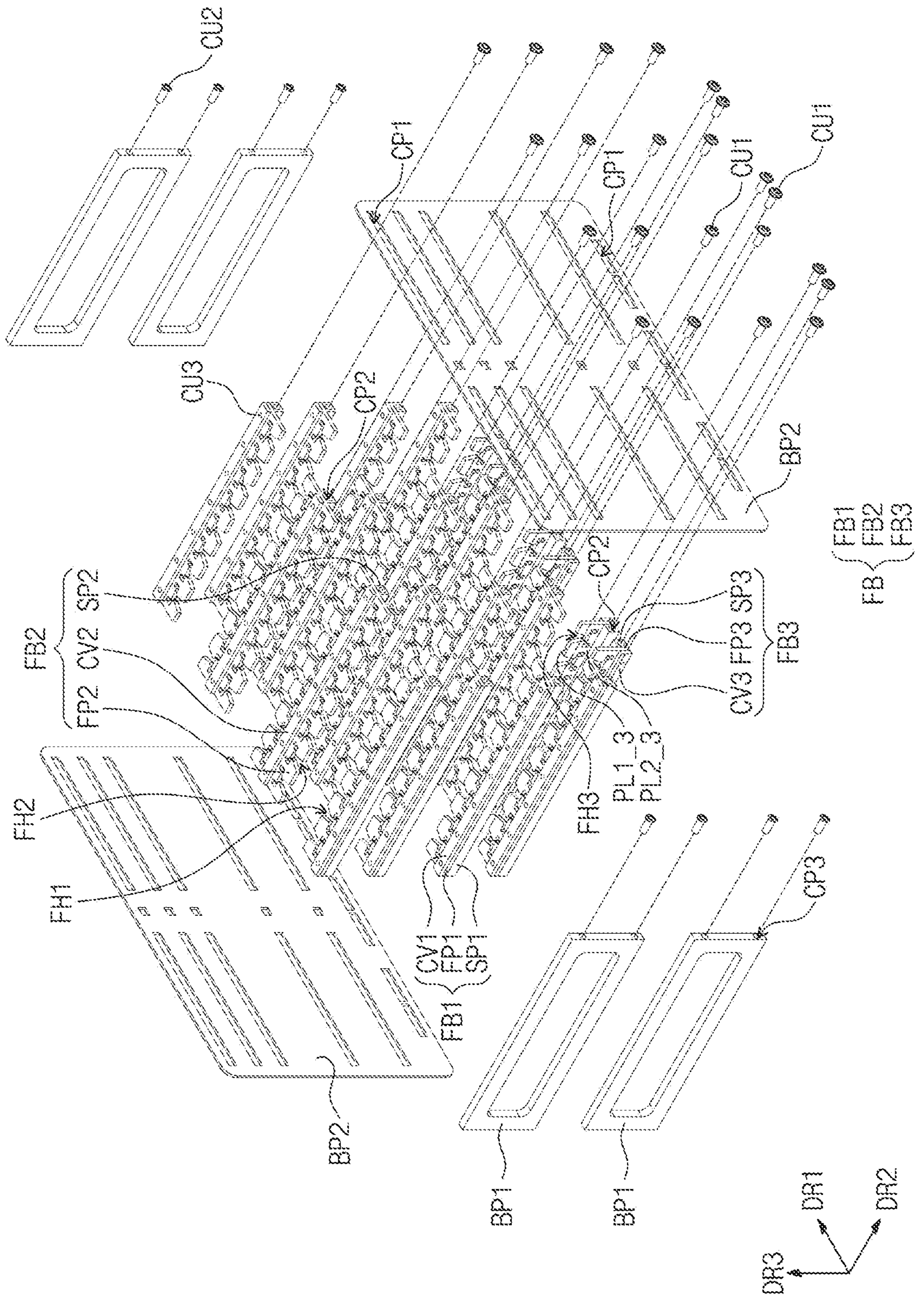
FIG. 2 is an exploded perspective view of the substrate loading station shown in FIG. 1.

FIG. 2 is an exploded perspective view of the substrate loading station SLP shown in FIG. 1.

Referring to FIG. 2, the supporters FB may be arranged in a plurality of layers in the third direction DR3. The supporters FB may be further disposed between lower portions of the second sidewall portions BP2. Each of third supporters FB3 disposed between the lower portions of the second sidewall portions BP2 may include a third support portion SP3, a third cover portion CV3, and a third holding portion FP3. The third holding portions FP3 of the third supporters FB3 disposed between the lower portions of the second sidewall portions BP2 may be arranged to face upwardly with respect to the third direction DR3. This arrangement state of the holding portions FP may be defined as a vertical arrangement state.

Hereinafter, from among the supporters FB each including the horizontally arranged holding portions FP, the supporters FB disposed adjacent to the first sidewall portions BP1 may be referred to as a first support FB1 and the supports FB disposed between the first supports FB1 may be referred to as a second support FB2. Each of the supporters FB including the vertically arranged holding portions FP3 may be referred to as a third supporter FB3. Hereinafter, because the supporters FB may have substantially the same structure as each other, one first supporter FB1, one second supporter FB2, and one third supporter FB3 will be described as representative examples.

The first supporter FB1 may face the second supporter FB2. The first and second supporters FB1 and FB2 may face each other in the first direction DR1 and may extend in the second direction DR2. The first and second supporters FB1 and FB2 may be disposed between the second sidewall portions BP2.

The support portion SP, the cover portion CV, and the holding portion FP of the first supporter FB1 may be referred to as a first support portion SP1, a first cover portion CV1, and a first holding portion FP1, respectively, and the support portion SP, the cover portion CV, and the holding portion FP of the second supporter FB2 may be referred to as a second support portion SP2, a second cover portion CV2, and a second holding portion FP2, respectively. The support portion SP, the cover portion CV, and the holding portion FP of the third supporter FB3 may be referred to as a third support portion SP3, a third cover portion CV3, and a third holding portion FP3, respectively.

The first supporter FB1 may include the first holding portion FP1, the first cover portion CV1, and the first support portion SP1. The first holding portion FP1 may be disposed on the first support portion SP1, and the first cover portion CV1 may be disposed on the first holding portion FP1. Accordingly, the first holding portion FP1 may be disposed between the first cover portion CV1 and the first support portion SP1. The first holding portion FP1, the first cover portion CV1, and the first support portion SP1 may be coupled with each other by third coupling units CU3. Detailed descriptions about the coupling structure between the first holding portion FP1, the first cover portion CV1, and the first support portion SP1 will be described in more detail with reference to FIG. 3. As an example, each of the third coupling units CU3 may be a screw.

The second supporter FB2 may include the second holding portion FP2, the second cover portion CV2, and the second support portion SP2. The second holding portion FP2 may be disposed on the second support portion SP2, and the second cover portion CV2 may be disposed on the second holding portion FP2. Accordingly, the second holding portion FP2 may be disposed between the second cover portion CV2 and the second support portion SP2. The second holding portion FP2, the second cover portion CV2, and the second support portion SP2 may be coupled with each other by third coupling units CU3. The coupling structure between the second holding portion FP2, the second cover portion CV2, and the second support portion SP2 may be substantially the same as the coupling structure between the first holding portion FP1, the first cover portion CV1, and the first support portion SP1.

The second holding portion FP2, the second cover portion CV2, and the second support portion SP2 may have a shape symmetrical to that of the first holding portion FP1, the first cover portion CV1, and the first support portion SP1, respectively, with respect to each other in the first direction DR1. The second holding portion FP2, the second cover portion CV2, and the second support portion SP2 may have substantially the same shape as that of the first holding portion FP1, the first cover portion CV1, and the first support portion SP1, respectively, and may be symmetrical to the first holding portion FP1, the first cover portion CV1, and the first support portion SP1 with respect to each other in the first direction DR1.

The first and second holding portions FP1 and FP2 may include a polytetrafluoroethylene (PTFE) material, such as Teflon® (a registered trademark of The Chemours Company FC, LLC of Wilmington, Delaware), however, they should not be limited thereto or thereby. A plurality of first holding grooves FH1 may be defined in the first holding portion FP1. As an example, the first holding grooves FH1 may be defined in one surface of the first holding portion FP1 facing the second holding portion FP2. The first holding grooves FH1 may be arranged in the second direction DR2. Detailed structure of the first holding grooves FH1 will be described in more detail later with reference to FIGS. 3 to 7.

The first support portion SP1 may be disposed under the first holding portion FP1. The first support portion SP1 may extend in the second direction DR2. Second coupling recesses CP2 may be defined in both side surfaces of the first support portion SP1, which are opposite to each other in the second direction DR2. The second coupling recesses CP2 may be defined in the first support portion SP1 disposed below the first holding portion FP1.

The second holding portion FP2 may face the first holding portion FP1 in the first direction DR1 and, together with the first holding portion FP1, may hold a window substrate. The structure in which the window substrate is held by the first and second holding portions FP1 and FP2 will be described in more detail later with reference to FIG. 7.

The second holding portions FP2 may include a polytetrafluoroethylene (PTFE) material, such as Teflon® (a registered trademark of The Chemours Company FC, LLC of Wilmington, Delaware), however, it should not be limited thereto or thereby. Second holding grooves FH2 may be defined in one surface of the second holding portions FP2, which faces the first holding portions FP1. The second holding grooves FH2 may extend in and may be arranged in the second direction DR2. The second holding grooves FH2 may have substantially the same shape as that of the first holding grooves FH1 and may be symmetrical to the first holding grooves FH1 with respect to each other in the first direction DR1.

The second support portion SP2 may be disposed under the second holding portions FP2. The second support portion SP2 may extend in the second direction DR2. Second coupling recesses CP2 may be defined in both side surfaces of the second support portion SP2, which are opposite to each other in the second direction DR2. The second coupling recesses CP2 may be defined in the second support portion SP2 disposed below the second holding portions FP2.

The first and second support portions SP1 and SP2 may be connected to the second sidewall portions BP2 by the first coupling units CU1. The first coupling units CU1 may be connected to the first and second support portions SP1 and SP2 via the first coupling openings CP1 defined through the second sidewall portions BP2 and the second coupling recesses CP2 defined through the first and second support portions SP1 and SP2, and thus, the first and second support portions SP1 and SP2 may be connected to the second sidewall portions BP2. The first coupling units CU1 may be inserted into the second coupling recesses CP2 after passing through the first coupling openings CP1.

The third supporter FB3 may be disposed below the first and second supporters FB1 and FB2. The third supporter FB3 may include the third holding portion FP3, the third cover portion CV3, and the third support portion SP3. For example, the third holding portion FP3 may be disposed between the third cover portion CV3 and the third support portion SP3 of the third supporter FB3. When viewed in the second direction DR2, the third cover portion CV3 may be disposed at a left side of the third holding portion FP3, and the third support portion SP3 may be disposed at a right side of the third holding portion FP3.

The third holding portion FP3, the third cover portion CV3, and the third support portion SP3 may have substantially the same shape as the first holding portion FP1, the first cover portion CV1, and the first support portion SP1, respectively. The first support portion SP1, the first holding portion FP1, and the first cover portion CV1 may be sequentially stacked in the third direction DR3, however, the third cover portion CV3, the third holding portion FP3, and the third support portion SP3 may be sequentially stacked in the first direction DR1.

The third holding portion FP3, the third cover portion CV3, and the third support portion SP3 may be coupled with each other by the third coupling units CU3. The coupling structure between the third holding portion FP3, the third cover portion CV3, and the third support portion SP3 may be substantially the same as the coupling structure between the first holding portion FP1, the first cover portion CV1, and the first support portion SP1.

The third holding portions FP3 may include a polytetrafluoroethylene (PTFE) material, such as Teflon® (a registered trademark of The Chemours Company FC, LLC of Wilmington, Delaware), however, they should not be limited thereto or thereby. A plurality of third holding grooves FH3 may be defined in the third holding portion FP3. The third holding grooves FH3 may extend in and may be arranged in the second direction DR2. The third holding grooves FH3 may have substantially the same shape as that of the first holding grooves FH1 and may be defined to face upwardly.

The holding grooves FH shown in FIG. 1 may include the first holding grooves FH1 defined in the first holding portion FP1, the second holding grooves FH2 defined in the second holding portion FP2, and the third holding grooves FH3 defined in the third holding portion FP3.

The third support portion SP3 may be connected to the second sidewall portions BP2 by the first coupling units CU1. The first coupling units CU1 may be connected to the third support portion SP3 via the first coupling openings CP1 defined through the second sidewall portions BP2 and the second coupling recesses CP2 defined through the third support portion SP3, and thus, the third support portion SP3 may be connected to the second sidewall portions BP2. The first coupling units CU1 may be inserted into the second coupling recesses CP2 after passing through the first coupling openings CP1.

Third coupling recesses CP3 may be defined in the first sidewall portions BP1. The third coupling recesses CP3 may be defined in both side surfaces, which are opposite to each other in the second direction DR2, of the first sidewall portions BP1. The third coupling recesses CP3 may be provided in plural in the third direction DR3.

The first coupling openings CP1 may be defined through the second sidewall portions BP2. The first coupling openings CP1 may be defined to penetrate the second sidewall portions BP2 in the second direction DR2. The first coupling openings CP1 may be provided in plural in the third direction DR3. The first coupling openings CP1 may be provided in plural in the first direction DR1. The first coupling openings CP1 may extend in the first direction DR1.

The first sidewall portions BP1 may be coupled with the second sidewall portions BP2 by the second coupling units CU2. For example, the second coupling units CU2 may be inserted into the third coupling recesses CP3, which are defined through the first sidewall portions BP1, after passing through the first coupling openings CP1 defined through the second sidewall portions BP2.

Figure 3:
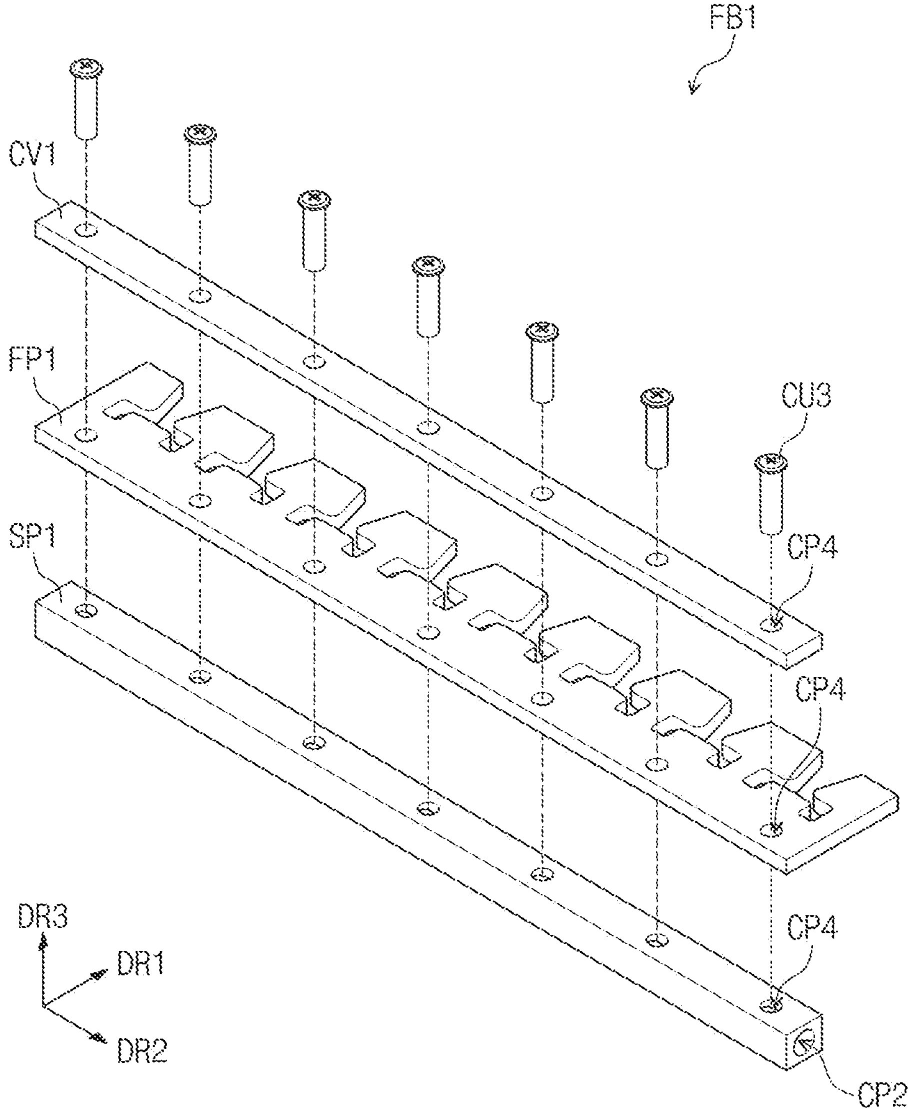
FIG. 3 is an exploded perspective view of one first supporter shown in FIG. 2.

FIG. 3 is an exploded perspective view of one first supporter FB1 shown in FIG. 2.

As an example, FIG. 3 shows a configuration of the first supporter FB1. The second and third supporters FB2 and FB3 may have substantially the same configuration as that of the first supporter FB1 shown in FIG. 3 and, accordingly, a repeated description thereof may be omitted.

Referring to FIG. 3, the first cover portion CV1 may be disposed above an upper surface of the first holding portion FP1. The first support portion SP1 may be disposed under a lower surface of the first holding portion FP1.

Fourth coupling openings CP4 may be respectively defined through the first cover portion CV1, the first holding portion FP1, and the first support portion SP1 to overlap each other in the third direction DR3. The fourth coupling openings CP4 respectively defined in the first cover portion CV1, the first holding portion FP1, and the first support portion SP1 may be arranged in the second direction DR2. The third coupling units CU3 may extend in the third direction DR3. The third coupling units CU3 may be inserted into the fourth coupling openings CP4 defined in the first cover portion CV1, the first holding portion FP1, and the first support portion SP1, and thus, the first cover portion CV1, the first holding portion FP1, and the first support portion SP1 may be connected to each other.

In the present embodiment, the coupling structure between the first holding portion FP1, the first cover portion CV1, and the first support portion SP1 is described as a representative example. The coupling structure between the second holding portion FP2, the second cover portion CV2, and the second support portion SP2 and the coupling structure between the third holding portion FP3, the third cover portion CV3, and the third support portion SP3 may be substantially the same as the coupling structure between the first holding portion FP1, the first cover portion CV1, and the first support portion SP1.

Figure 4:
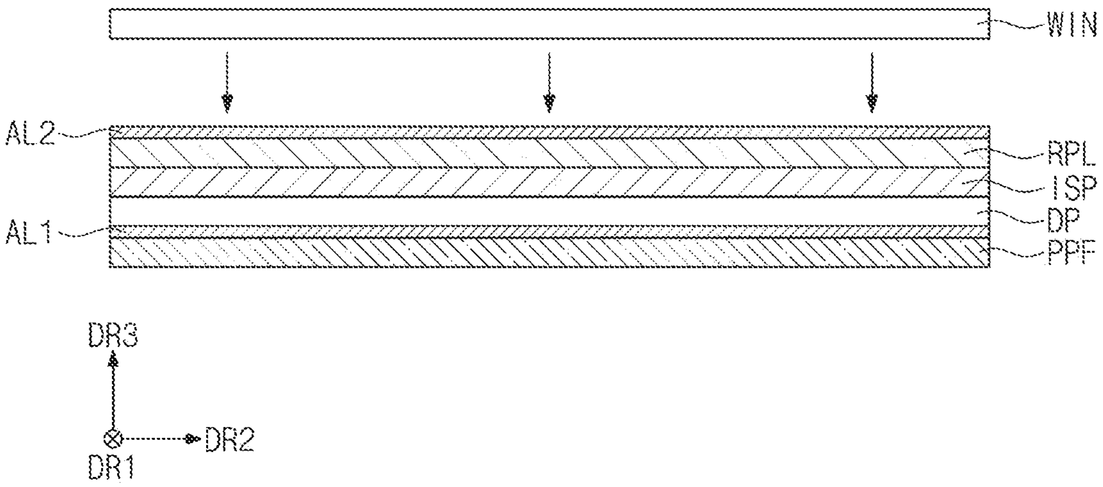
FIGS. 4 and 5 are cross-sectional views of a display device manufactured with a window substrate.
Figure 5:
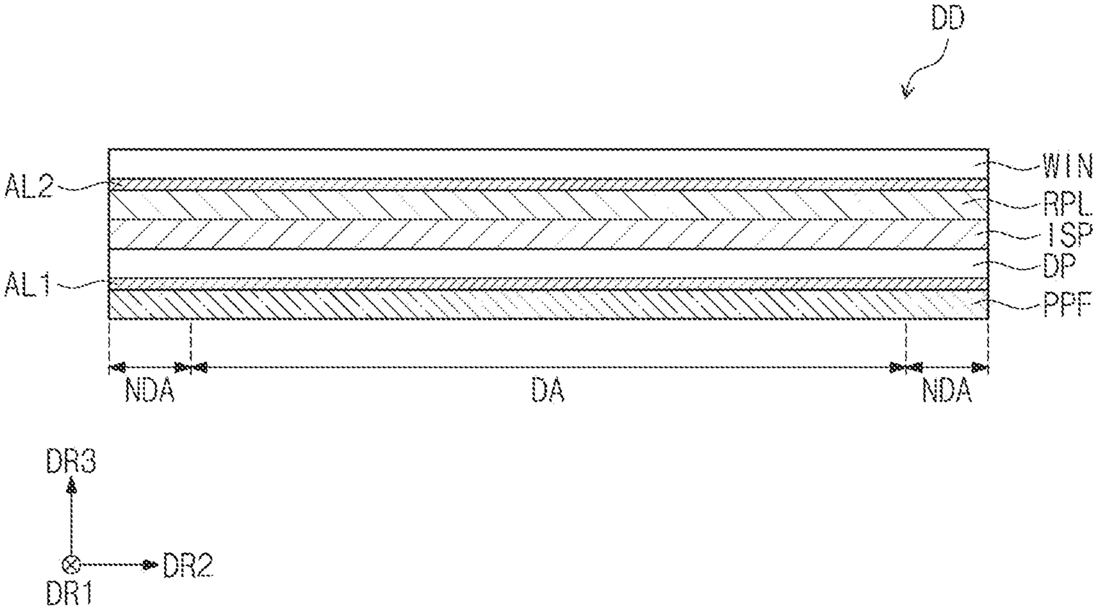

FIGS. 4 and 5 are cross-sectional views of a display device DD manufactured with the window substrate.

Referring to FIGS. 4 and 5, the display device DD may include a display panel DP, an input sensing unit ISP, an anti-reflective layer RPL, the window substrate WIN, a panel protective film PPF, and first and second adhesive layers AL1 and AL2. The window substrate WIN may be loaded on the substrate loading station SLP shown in FIG. 1. A plurality of window substrates may be loaded on the substrate loading station SLP shown in FIG. 1, and one window substrate WIN may be transferred by a substrate transfer unit and may be used to manufacture the display device when the display device is manufactured.

The display panel DP may be a flexible display panel. The display panel DP may be a light-emitting type display panel; however, the display panel DP is not particularly limited. For example, the display panel DP may be an organic light emitting display panel or an inorganic light emitting display panel. A light emitting layer of the organic light emitting display panel may include an organic light emitting material. A light emitting layer of the inorganic light emitting display panel may include a quantum dot or a quantum rod.

The input sensing unit ISP may be disposed on the display panel DP. The input sensing unit ISP may include a plurality of sensing portions configured to sense an external input by a capacitive method. The input sensing unit ISP may be manufactured directly on the display panel DP when the display device DD is manufactured; however, it is not limited thereto or thereby. According to an embodiment, the input sensing unit ISP may be attached to the display panel DP by an adhesive layer after being manufactured separately from the display panel DP.

The anti-reflective layer RPL may be disposed on the input sensing unit ISP. The anti-reflective layer RPL may be manufactured directly on the input sensing unit ISP when the display device DD is manufactured; however, the present disclosure is not limited thereto or thereby. According to an embodiment, the anti-reflective layer RPL may be attached to the input sensing unit ISP by an adhesive layer after being manufactured as a separate panel.

The anti-reflective layer RPL may be defined as an external-light reflection preventing film. The anti-reflective layer RPL may reduce a reflectance with respect to external light incident to the display panel DP from the above of the display device DD. The external light may not be perceived by the user due to the anti-reflective layer RPL.

When external light incident to the display panel DP is provided to (e.g., is visible to) the user after being reflected by the display panel DP, like a mirror, the user may perceive the external light. To prevent this phenomenon, the anti-reflective layer RPL may include color filters CF that display the same colors as those of pixels.

The color filters may filter the external light such that the external light may have the same colors as those of the pixels. In such an embodiment, the external light may not be perceived by the user. However, the present disclosure is not limited thereto or thereby, and the anti-reflective layer RPL may include a retarder and/or a polarizer to reduce the reflectance with respect to the external light.

The window substrate WIN may be disposed on the anti-reflective layer RPL. The window substrate WIN may protect the display panel DP, the input sensing unit ISP, and the anti-reflective layer RPL from external scratches and impacts.

The panel protective film PPF may be disposed under the display panel DP. The panel protective film PPF may protect a lower portion (e.g., a lower surface) of the display panel DP. The panel protective film PPF may include a flexible plastic material, such as polyethylene terephthalate (PET).

The first adhesive layer AL1 may be disposed between the display panel DP and the panel protective film PPF. The display panel DP and the panel protective film PPF may be coupled to each other by the first adhesive layer AL1.

When the display device is manufactured, the window substrate WIN loaded on the substrate loading station SLP may be transferred by the substrate transfer unit and may be disposed on the anti-reflective layer. The second adhesive layer AL2 may be disposed between the window substrate WIN and the anti-reflective layer RPL, and the window substrate WIN may be attached to the anti-reflective layer RPL by the second adhesive layer AL2. The window substrate WIN disposed above the anti-reflective layer RPL may be pressed against the anti-reflective layer RPL to be attached to the anti-reflective layer RPL.

Figure 6:
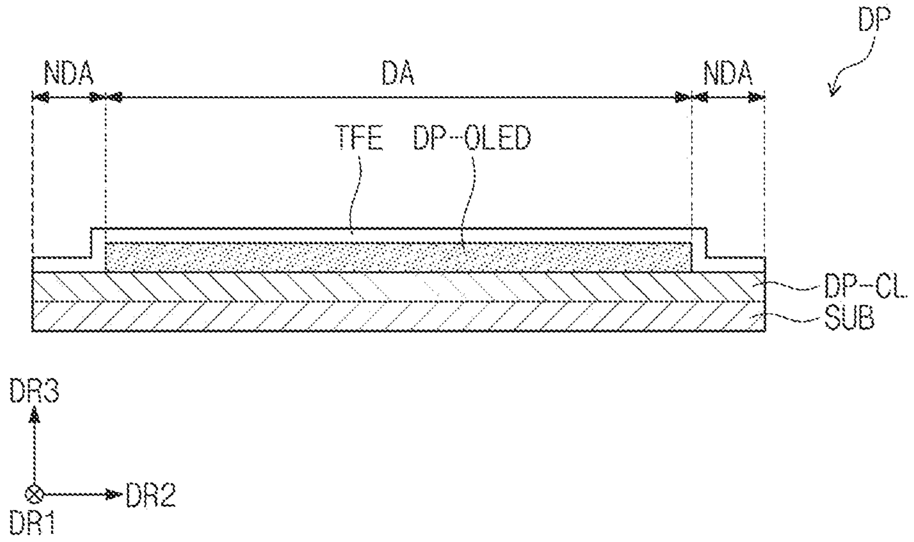
FIG. 6 is a cross-sectional view of a display panel.

FIG. 6 is a cross-sectional view of the display panel DP.

FIG. 6 shows a cross-section of the display panel DP when viewed in the first direction DR1.

Referring to FIG. 6, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may have a display area DA and a non-display area NDA around the display area DA. The substrate SUB may include a glass material or a flexible plastic material, such as polyimide (PI). The display element layer DP-OLED may be disposed in the display area DA.

A plurality of pixels may be disposed in the circuit element layer DP-CL and the display element layer DP-OLED. Each pixel may include a transistor disposed in the circuit element layer DP-CL and a light emitting element disposed in the display element layer DP-OLED and connected to the transistor.

The thin film encapsulation layer TFE may be disposed on the circuit element layer DP-CL to cover the display element layer DP-OLED. The thin film encapsulation layer TFE may protect the pixels from moisture, oxygen, and a foreign substance.

Figure 7:
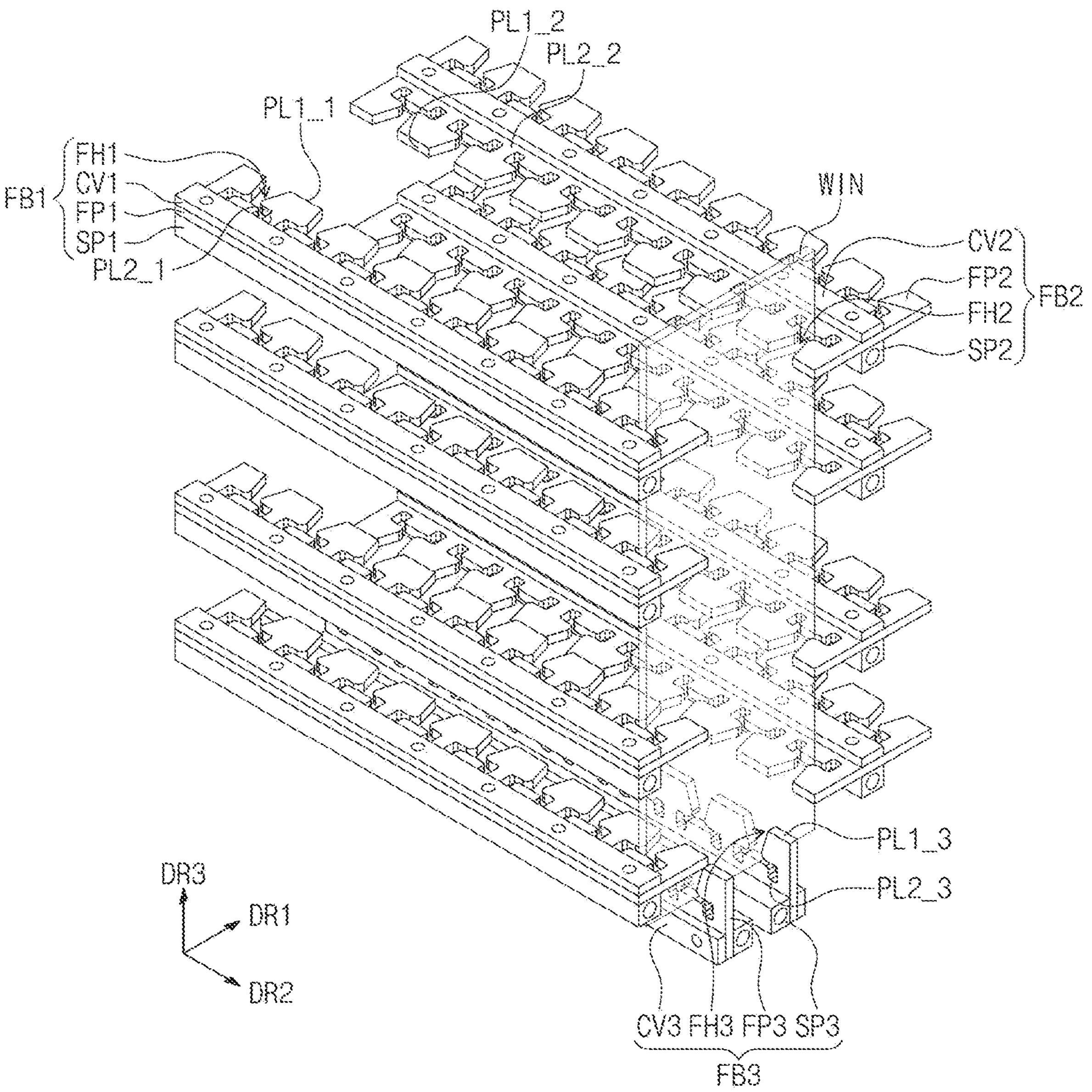
FIG. 7 is a perspective view of a substrate loading station in which a window substrate is loaded.
Figure 8:
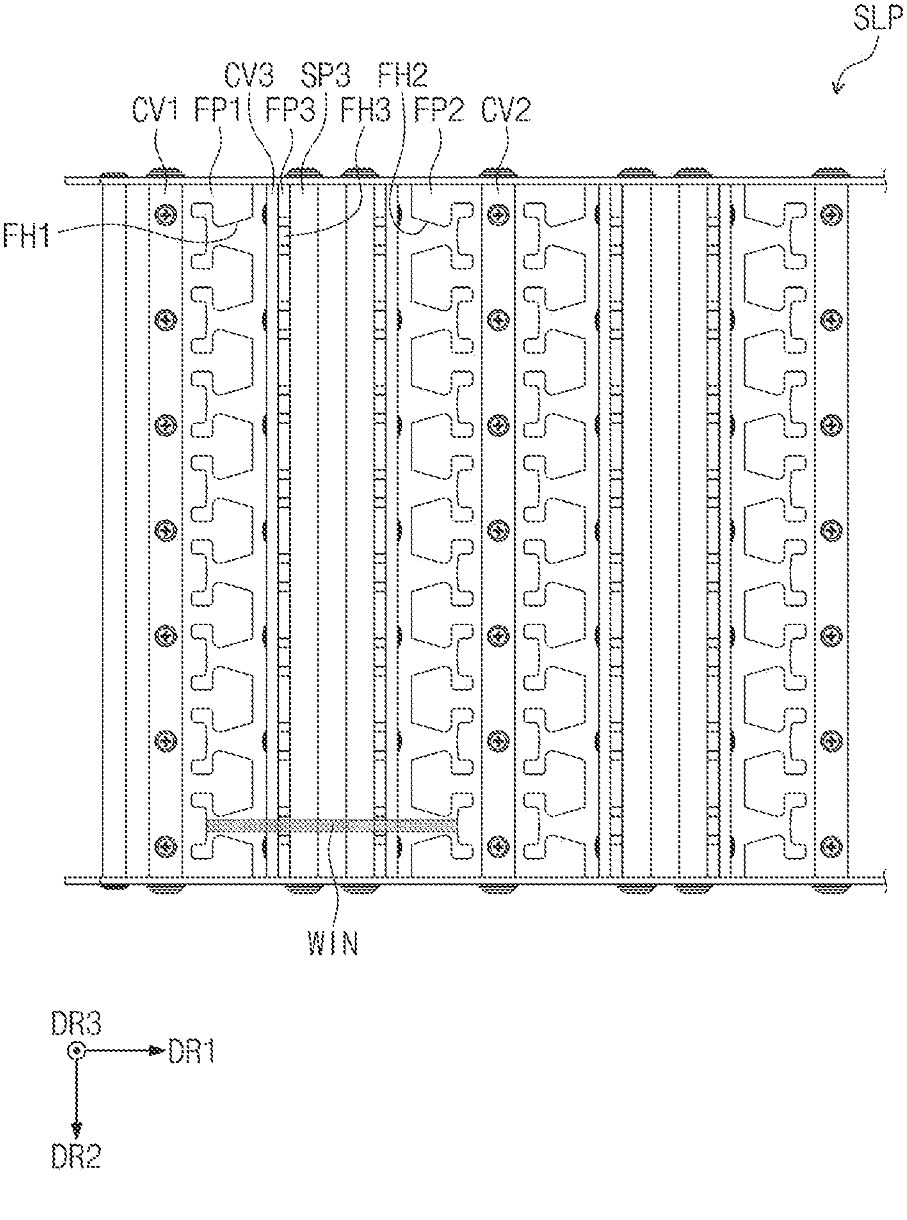
FIG. 8 is a top view of a substrate loading station in which a window substrate is loaded.
Figure 9:
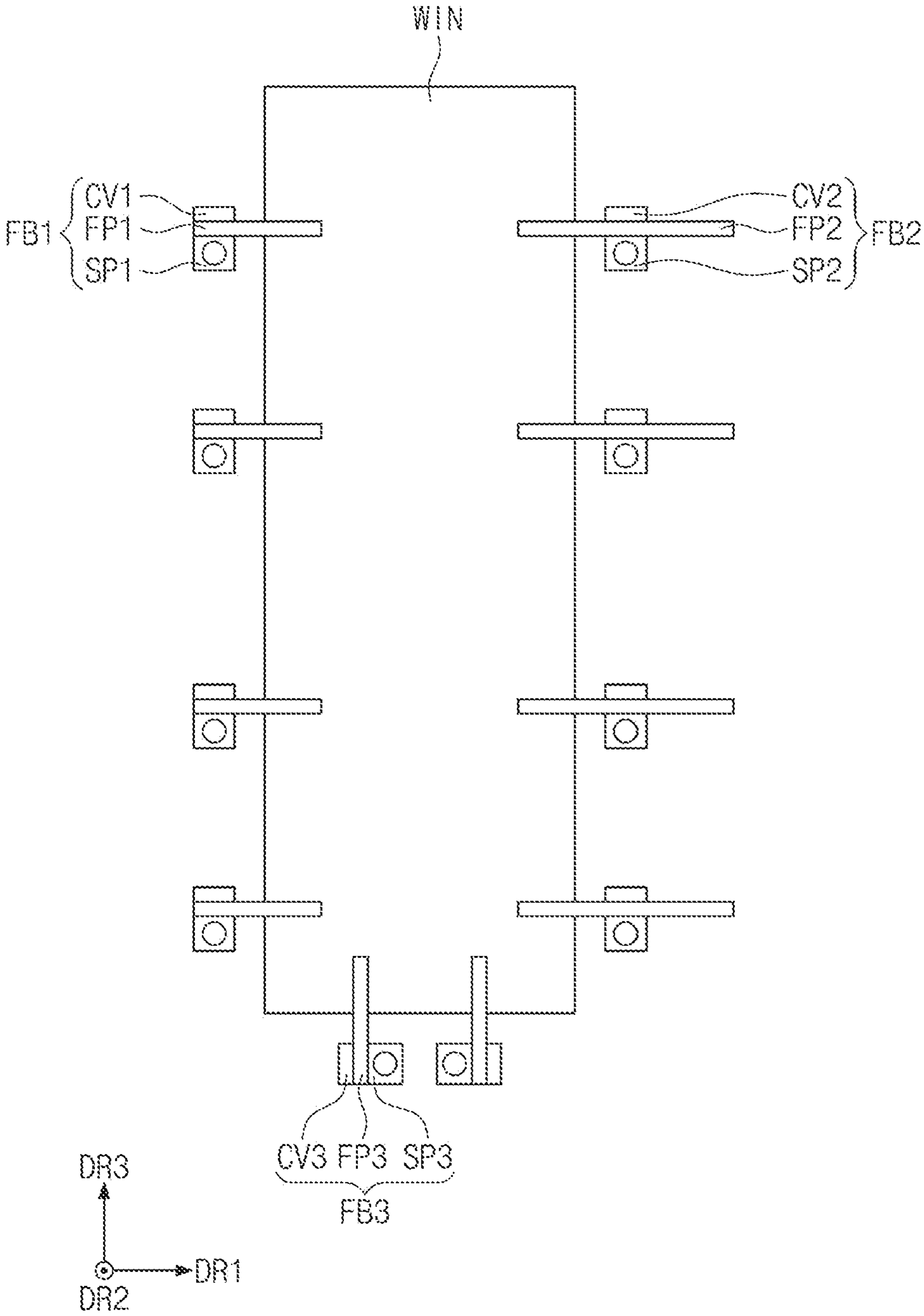
FIG. 9 is a side view of a substrate loading station in which a window substrate is loaded.

FIG. 7 is a perspective view of the substrate loading station in which the window substrate WIN is loaded. FIG. 8 is a top view of the substrate loading station SLP in which the window substrate WIN is loaded. FIG. 9 is a side view of the substrate loading station in which the window substrate WIN is loaded.

In the illustrated embodiment, the substrate loading station SLP in which one window substrate WIN is loaded is shown as a representative example; however, a plurality of window substrates WIN may be loaded in the substrate loading station SLP.

Referring to FIGS. 7, 8, and 9, the first, second, and third holding grooves FH1, FH2, and FH3 may be respectively defined in the one surface of the first, second, and third holding portions FP1, FP2, and FP3.

Hereinafter, configurations of one first holding portion FP1, one second holding portion FP2, and one third holding portion FP3 will be described in detail.

The first holding grooves FH1 may be defined in a first surface PL1_1 of the first holding portion FP1 facing the second holding portion FP2.

The first holding grooves FH1 may extend in the first direction DR1 from the first surface PL1_1 of the first holding portion FP1 toward a second surface PL2_1 opposite to the first surface PL1_1. The first surface PL1_1 and the second surface PL2_1 of the first holding portion FP1 may be both side surfaces of the first holding portion FP1, which are opposite to each other in the first direction DR1. The first holding grooves FH1 may be arranged in the second direction DR2.

The second holding grooves FH2 may be defined in a first surface PL1_2 of the second holding portion FP2, which faces the first holding portion FP1. The first surface PL1_2 and a second surface PL2_2 of the second holding portion FP2 may be both side surfaces of second holding portion FP2, which are opposite to each other in the first direction DR1. The second holding grooves FH2 may be arranged in the second direction DR2.

The third holding grooves FH3 may be defined in a first surface PL1_3 of the third holding portion FP3, which faces upwardly. The third holding grooves FH3 may extend in the third direction DR3 from the first surface PL1_3 of the third holding portion FP3 toward a second surface PL2_3 opposite to the first surface PL1_3. The first and second surfaces PL1_3 and PL2_3 of the third holding portion FP3 may be both side surfaces of the third holding portion FP3, which are opposite to each other in the third direction DR3. The third holding grooves FH3 may be arranged in the second direction DR2.

Referring to FIGS. 7 and 8, both side surfaces of the window substrate WIN, which are opposite to each other in the first direction DR1, may be respectively inserted into the first and second holding grooves FH1 and FH2. For example, when viewed in a plane, a left side of the window substrate WIN with respect to the first direction DR1 may be inserted into a corresponding first holding groove FH1 from among the first holding grooves FH1. When viewed in the plane, a right side of the window substrate WIN with respect to the first direction DR1 may be inserted into a corresponding second holding groove FH2 from among the second holding grooves FH2. A lower portion of the window substrate WIN with respect to the third direction DR3 may be inserted into two corresponding third holding grooves FH3 from among the third holding grooves FH3.

Referring to FIGS. 7 to 9, when looking at the window substrate WIN from the second direction DR2 (see, e.g., FIG. 9), the left side of the window substrate WIN may be inserted into the first holding grooves FH1 respectively defined in the plural layers stacked in the third direction DR3. When looking at the window substrate WIN from the second direction DR2, the right side of the window substrate WIN may be inserted into the second holding grooves FH2 respectively defined in the plural layers stacked in the third direction DR3.

When looking at the window substrate WIN from the second direction DR2, the lower portion of the window substrate WIN may be inserted into the third holding grooves FH3. A plurality of window substrates WIN may be substantially concurrently (or simultaneously) inserted by the plural third holding grooves FH3 arranged in the second direction DR2.

FIG. 7 shows one window substrate WIN as a representative example; however, the plural window substrates WIN may be loaded on the substrate loading station SLP while being inserted into the first, second, and third holding grooves FH1, FH2, and FH3 according to the above-mentioned structure. A cleaning process may be performed on the window substrates WIN while the window substrates WIN are loaded on the substrate loading station SLP.

Figure 10:
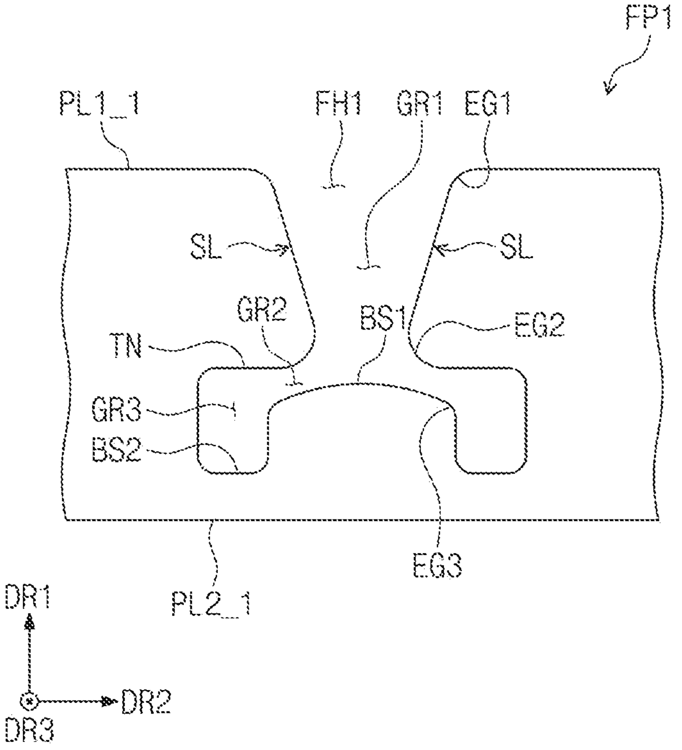
FIG. 10 is a view of one first holding groove shown in FIG. 7.

FIG. 10 is a view of one first holding groove FH1 shown in FIG. 7.

Referring to FIG. 10, the first holding groove FH1 may include a first groove GR1, a second groove GR2, and third grooves GR3. The first groove GR1 may extend in the first direction DR1 toward the second surface PL2_1 of the first holding portion FP1, which is opposite to the first surface PL1_1, from the first surface PL1_1. The first groove GR1 may have a width in the second direction DR2 that decreases as it nears the second surface PL2_1.

The second groove GR2 may extend from an end of the first groove GR1 toward both sides of the first holding portion FP1, which are opposite to each other in the second direction DR2 crossing the first direction DR1. The second groove GR2 may substantially extend in the second direction DR2.

The third grooves GR3 may extend from ends of the second groove GR2, which are opposite to each other in the second direction DR2, toward the second surface PL2_1 along the first direction DR1. The third grooves GR3 may be defined as an accommodating space. The third grooves GR3 may be defined closer to the second surface PL2_1 of the first holding portion FP1 than the second groove GR2 is.

The first holding portion FP1 may include inner inclined surfaces SL facing each other, being symmetrical with respect to each other in the second direction DR2 and defining the first groove GR1 between the first surface PL1_1 and the second surface PL2_1. The inner inclined surfaces SL of the first groove GR1 may be inclined at an obtuse angle with respect to the first surface PL1_1. First boundary surfaces EG1 between the first surface PL1_1 and the inner inclined surfaces SL may have a convex curve shape. A width in the second direction DR2 between the inner inclined surfaces SL may decrease as it goes from the first surface PL1_1 toward the second surface PL2_1.

The first holding portion FP1 may be provided with tunnel surfaces TN that are defined therein and extend from the inner inclined surfaces SL toward both sides of the first holding portion FP1, which are opposite to each other in the second direction DR2, to define the second groove GR2. Second boundary surfaces EG2 between the inner inclined surfaces SL and the tunnel surfaces TN may have a convex curve shape.

The first holding portion FP1 may include a first bottom surface BS1 exposed through the first groove GR1. The first bottom surface BS1 may be closer to the second surface PL2_1 than the inner inclined surfaces SL are. The first bottom surface BS1 may have a curved shape convex to the first groove GR1.

The first holding portion FP1 may include second bottom surfaces BS2 that are recessed from both sides of the first bottom surface BS1, which are opposite to each other in the second direction DR2, toward the second surface PL2_1 to define the third grooves GR3. The second bottom surfaces BS2 may be closer to the second surface PL2_1 than the first bottom surface BS1 is. The second bottom surfaces BS2 may be disposed below the first bottom surface BS1 in the first direction DR1.

Third boundary surfaces EG3 that are toward the second bottom surfaces from both sides of the first bottom surface BS1, which are opposite to each other in the second direction DR2, may have a convex curve surface.

In the illustrated embodiment, the first holding groove FH1 is described as a representative example, and each of the second and third holding grooves FH2 and FH3 may have substantially the same shape as that of the first holding groove FH1 described above.

Figure 11A:
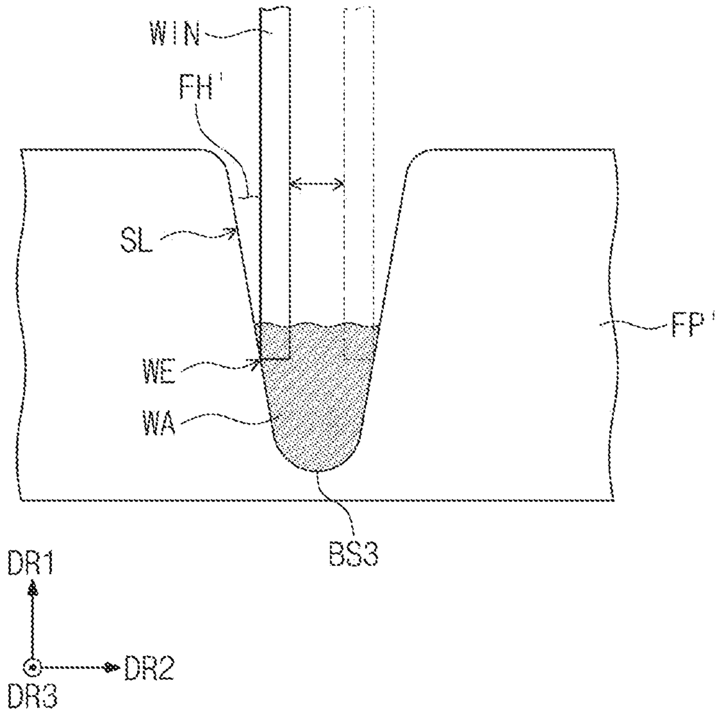
FIGS. 11A and 11B are views of a portion of substrate loading stations according to comparative examples.
Figure 11B:
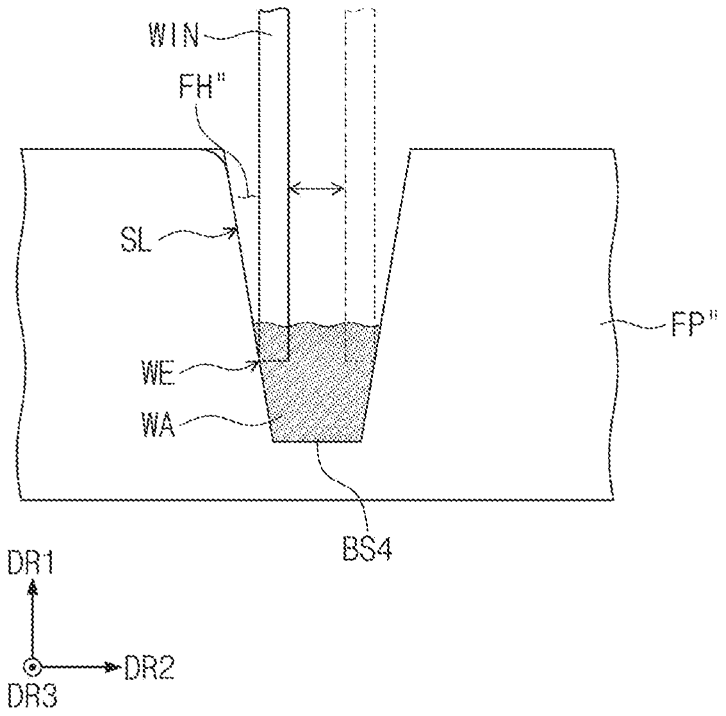

FIGS. 11A and 11B are views of a portion of substrate loading stations according to comparative examples.

Different from the first holding portion FP1 shown in FIG. 10, second and third grooves GR2 and GR3 are not defined in holding portions FP' and FP" shown in FIGS. 11A and 11B. In addition, different from the holding portion FP shown in FIG. 1, the holding portions FP' and FP" shown in FIGS. 11A and 11B do not include the first bottom surface BS1 (see, e.g., FIG. 10) that is convex upwardly.

Referring to FIG. 11A, a holding groove FH' may be defined in the holding portion FP'. A width in the second direction DR2 of the holding groove FH' may decrease as a distance from a lower portion of the first holding portion FP' decreases. The holding groove FH' may be defined by inner inclined surfaces SL facing each other in the second direction DR2 and inclined with respect to an upper surface of the holding portion FP'. A bottom surface BS3 defining the holding groove FH' together with the inner inclined surfaces SL may have a shape that is concave downwardly.

Widths between the inner inclined surfaces SL may decrease as it goes to a direction opposite to the first direction DR1. When a window substrate WIN is inserted into the holding groove FH' of the holding portion FP', both corners WE of one side surface of the window substrate WIN facing the bottom surface BS3 may be in contact with the inner inclined surfaces SL of the holding portion FP'. In this case, both corners WE of the window substrate WIN, which are in contact with the inner inclined surfaces, may be damaged. When the bottom surface BS3 is a convex downward surface instead of a convex upward surface, both corners WE of the window substrate WIN may be in contact with the bottom surface BS3 of the holding portion FP' and may be damaged.

In addition, when the third grooves GR3 (see, e.g., FIG. 10) are not defined in the holding portion FP', a cleaning solution WA used to clean the window substrate WIN may remain in the holding groove FH' and may move to a next process while being attached to a surface of the window substrate WIN.

Referring to FIG. 11B, a holding groove FH" may be defined in the holding portion FP". A width in the second direction DR2 of the holding groove FH" may decrease as a distance from a lower portion of the holding portion FP" decreases. The holding groove FH" may be defined by inner inclined surfaces SL facing each other in the second direction DR2 and inclined with respect to an upper surface of the holding portion FP". A bottom surface BS4 defining the holding groove FH" together with the inner inclined surfaces SL may have a flat shape.

Widths between the inner inclined surfaces SL may decrease as it extends in the first direction DR1. When a window substrate WIN is inserted into the holding groove FH" of the holding portion FP", both corners WE of one side surface of the window substrate WIN may be damaged due to friction against or contact with the bottom surface BS4 of the holding portion FP" when the widths between the inner inclined surfaces SL in the first direction DR1 decreases and the bottom surface BS4 is a flat surface instead of an upward convex surface.

In addition, when the third grooves GR3 (see, e.g., FIG. 10) are not defined in the holding portion FP", a cleaning solution WA used to clean the window substrate WIN may remain in the holding groove FH" and may move to a next process while being attached to a surface of the window substrate WIN.

Figure 12:
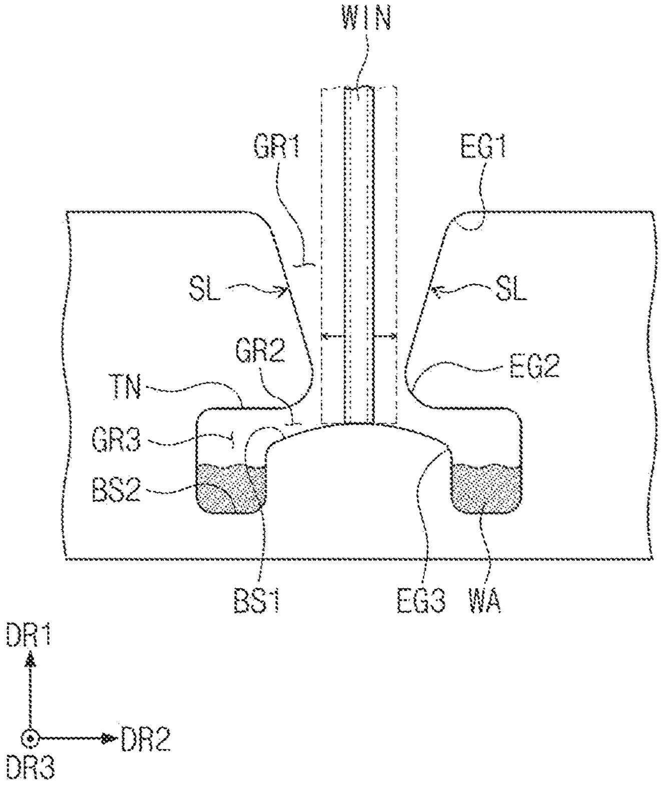
FIG. 12 is a view of a window substrate inserted into the first holding groove shown in FIG. 10.
Figure 13:
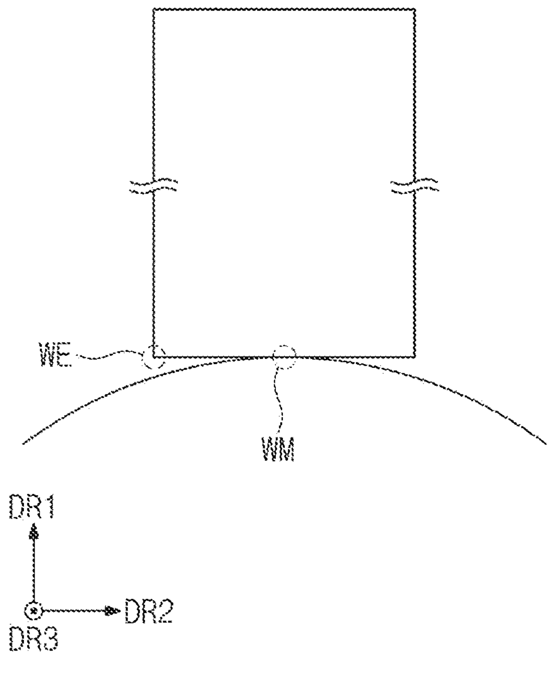
FIG. 13 is a view of a window substrate that is in contact with a first bottom surface shown in FIG. 10.

FIG. 12 is a view of the window substrate inserted into the first holding groove of the first holding portion shown in FIG. 10. FIG. 13 is a view of the window substrate that is in contact with the first bottom surface shown in FIG. 10.

Referring to FIGS. 12 and 13, different from the holding portions FP' and FP", the first bottom surface BS1 may have a convex surface toward the first groove GR1. In addition, the second groove GR2 that extends in the second direction DR2 from the first groove GR1 may be defined in the first holding portion FP1.

When the window substrate WIN (see, e.g., FIG. 7) is inserted into the first holding groove FH1 (see, e.g., FIG. 10), one surface of the window substrate WIN, which faces the first bottom surface BS1, may be in contact with the first bottom surface BS1. In FIGS. 11A and 11B, both corners WE of the one surface of the window substrate WIN are in contact with the inner inclined surfaces SL. However, according to the illustrated embodiment, both corners WE of the one surface of the window substrate WIN may not be in contact with the inner inclined surfaces SL. Because both corners WE of the one surface of the window substrate are not in contact with the inner inclined surfaces SL, damage of the corners WE of the window substrate WIN, which is caused by the contact between the corners WE of the window substrate WIN and the inner inclined surfaces SL, may be prevented.

Because the first bottom surface BS1 has the convex curve surface, a center portion WM of the one surface of the window substrate WIN may be in contact with the first bottom surface BS1. Both corners WE of the one surface of the window substrate WIN may not be in contact with the first bottom surface BS1. Accordingly, the corners WE of the window substrate WIN may not be damaged.

Different from the embodiment shown in FIG. 12, when the second boundary surfaces EG2 have a pointed shape rather than the curved surface, both corners WE of the window substrate WIN opposite to each other in the second direction DR2 may be in contact with the second boundary surfaces EG2 and may be damaged. However, according to the illustrated embodiment, because the second boundary surfaces EG2 have the curved surface, both corners WE of the window substrate WIN may not be damaged.

According to the structure of the first holding groove FH1 described above, the corners WE of the one surface of the window substrate WIN may not be in contact with inner surfaces of the first holding portion FP1, which define the first holding groove FH1. In the second holding groove FH2 having the same shape as that of the first holding groove FH1, corners WE of the other surface of the window substrate WIN may not be in contact with inner surfaces of the second holding portion FP2, which define the second holding groove FH2.

Referring to FIG. 12, when a cleaning process is performed on the window substrate WIN while the window substrates WIN are loaded on the substrate loading station SLP, the cleaning solution WA may be supplied to the substrate loading station SLP. The window substrate WIN may be cleaned by the cleaning solution WA. If the cleaning solution WA remains in the first and second grooves GR1 and GR2 after the cleaning process is finished, foreign substances remaining in the cleaning solution WA may adhere to the surface of the window substrate WIN.

According to embodiments of the present disclosure, because the cleaning solution WA flows down into the third grooves GR3 and is accommodated in the third grooves GR3, the phenomenon in which foreign substances adhere to the surface of the window substrate WIN may be prevented or reduced. Even though the cleaning solution WA remains in the first and second grooves GR1 and GR2 after the cleaning process is finished, the cleaning solution WA may be accommodated in the third grooves GR3 along the boundary surfaces EG3 because the boundary surfaces EG3 defined at both sides of the first bottom surface BS1 have the convex surface. Accordingly, the phenomenon in which foreign substances remaining in the cleaning solution WA adhere to the surface of the window substrate WIN may be prevented or reduced.

Figure 14:
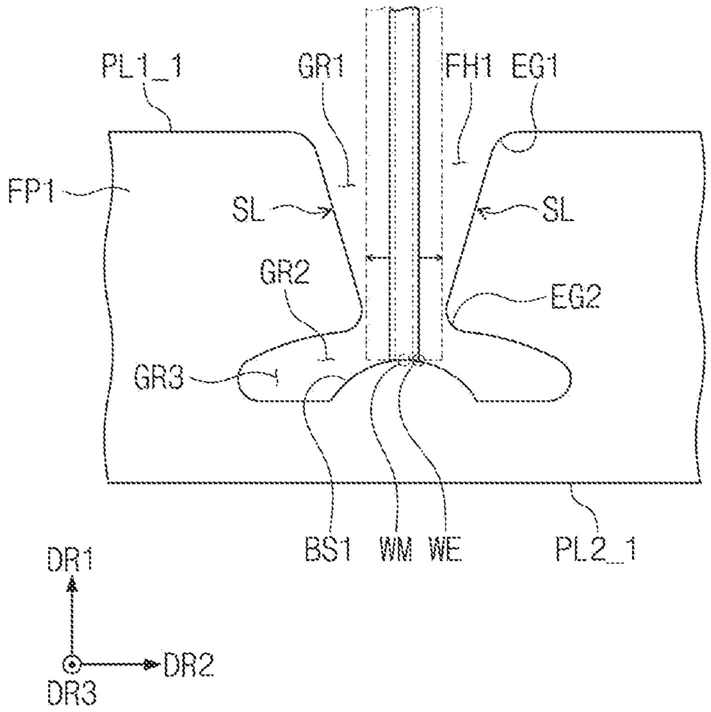
FIG. 14 is a view of a first holding groove of a first holding portion according to an embodiment of the present disclosure.

FIG. 14 is a view of a first holding groove of a first holding portion according to an embodiment of the present disclosure.

In FIG. 14, descriptions of the first holding groove FH1 will primarily focus on features different from those of the first holding groove FH1 shown in FIG. 10, and the same reference numerals denote the same elements as in FIG. 10.

Referring to FIG. 14, a first bottom surface BS1 may have a curve surface convex toward a first groove GR1. In addition, a second groove GR2 may be defined in the first holding portion FP1 and may extend from the first groove GR1 to the second direction DR2.

When a window substrate WIN is inserted into the first holding groove FH1, a center portion WM of one side surface of the window substrate WIN, which faces a first bottom surface BS1, may be in contact with the first bottom surface BS1. Both corners WE of the one side surface of the window substrate WIN may not be in contact with inner inclined surfaces SL. Because both corners WE of the one side surface of the window substrate WIN are not in contact with the inner inclined surfaces SL, damage to the corners WE of the window substrate WIN, which is caused by the contact with the inner inclined surfaces SL, may be prevented.

Although embodiments of the present disclosure have been described herein, it is understood that the present disclosure should not be limited to these embodiments, but various changes and modifications can be made by one ordinary skilled in the art within the spirit and scope of the present disclosure as defined by the following claims and their equivalents. Therefore, the disclosed subject matter should not be limited to any single embodiment described herein, and the scope of the present disclosure shall be determined according to the attached claims and their equivalents.

What is claimed is:

1. A substrate loading station comprising:

a first holding portion having a first holding groove defined in a first surface thereof; and a second holding portion facing the first holding portion and configured to hold a window substrate together with the first holding portion, wherein the first surface of the first holding portion faces the second holding portion, wherein the first holding groove comprises:

a first groove extending from the first surface toward a second surface of the first holding portion, which is opposite to the first surface, along a first direction, the first groove being open at the first surface and having an end at a first bottom surface of the first holding portion, a width of the first bottom surface in a second direction crossing the first direction being greater than a narrowest width of the first groove;

a second groove extending from the end of the first groove toward both sides of the first holding portion, which are opposite to each other in the second direction, a greatest width of the second groove being greater than a greatest width of the first groove; and a plurality of third grooves extending from ends of the second groove extending in the second direction toward the second surface along the first direction, the third grooves being separated from each other by the first bottom surface, and wherein the third grooves do not overlap with the first groove in the first direction.

2. The substrate loading station of claim 1, wherein the first groove has a width in the second direction decreasing as a distance from the second surface decreases.

3. The substrate loading station of claim 1, wherein the third grooves are configured to accommodate a cleaning solution used to clean the window substrate.

4. The substrate loading station of claim 1, wherein the first holding portion has inner inclined surfaces facing each other, wherein the inner inclined surfaces are symmetrical with respect to each other in the second direction and defining the first groove between the first surface and the second surface.

5. The substrate loading station of claim 4, wherein the inner inclined surfaces are inclined at an obtuse angle with respect to the first surface, and wherein boundary surfaces between the first surface and the inner inclined surfaces have a curved surface.

6. The substrate loading station of claim 4, wherein the first holding portion comprises the first bottom surface being closer to the second surface than the inner inclined surfaces are, defines the second groove extending in the second direction, and is exposed through the first groove.

7. The substrate loading station of claim 6, wherein the first bottom surface has a curved surface convex to the first groove.

8. The substrate loading station of claim 6, wherein the first holding portion has second bottom surfaces recessed from both sides of the first bottom surface, which are opposite to each other in the second direction, toward the second surface to define the third grooves.

9. The substrate loading station of claim 4, further comprising tunnel surfaces extending from the inner inclined surfaces toward the both sides of the first holding portion to define the second groove, wherein boundary surfaces between the inner inclined surfaces and the tunnel surfaces have a curved surface.

10. The substrate loading station of claim 1, wherein the second holding portion has a second holding groove defined in a first surface thereof facing the first holding portion.

11. The substrate loading station of claim 10, wherein the second holding groove has a same shape as a shape of the first holding groove and is symmetrical with the first holding groove.

12. The substrate loading station of claim 10, wherein the first holding groove and the second holding groove are configured to receive both side surfaces of the window substrate, which are opposite to each other in the first direction.

13. The substrate loading station of claim 12, wherein the first and second holding portions respectively defining the first and second holding grooves are configured such that corners of the both side surfaces of the window substrate do not contact inner surfaces of the first and second holding portions.

14. The substrate loading station of claim 1, further comprising:

a first support portion;

a first cover portion on the first support portion;

a second support portion; and a second cover portion on the second support portion, wherein the first holding portion is between the first support portion and the first cover portion, wherein the second holding portion is between the second support portion and the second cover portion.

15. The substrate loading station of claim 14, further comprising:

a third support portion below the first and second support portions with respect to a third direction crossing a plane defined by the first and second directions; and a third holding portion below the first and second holding portions and in the third support portion, wherein a third holding groove defined in the third holding portion in the third direction is configured to receive a lower portion of the window substrate.

16. The substrate loading station of claim 15, wherein the third holding groove has a same shape as the first holding groove.

17. A substrate loading station comprising:

a first holding portion; and a second holding portion facing the first holding portion and configured to hold a window substrate together with the first holding portion, wherein the first holding portion has a first holding groove defined in a first surface thereof facing the second holding portion, wherein the first holding groove comprises:

a first groove extending from the first surface toward a second surface of the first holding portion, which is opposite to the first surface, along a first direction, the first groove being open at the first surface and having an end at a first bottom surface of the first holding portion;

a second groove extending from the end of the first groove to both sides of the first holding portion, which are opposite to each other in a second direction crossing the first direction, a greatest width of the second groove being greater than a greatest width of the first groove; and a plurality of third grooves extending from ends of the second groove extending in the second direction toward the second surface along the first direction, the third grooves being separated from each other by the first bottom surface, and wherein a width of the second groove in the second direction is greater than a greatest width of the first groove, and wherein the third grooves do not overlap with the first groove in the first direction.

18. The substrate loading station of claim 17, wherein the first bottom surface defines the second groove extending in the second direction and is exposed through the first groove, and wherein the first bottom surface has a curved surface convex to the first groove.

19. The substrate loading station of claim 18, wherein the first holding portion further comprises:

inner inclined surfaces facing each other, symmetrical with respect to each other in the second direction, and defining the first groove between the first surface and the second surface; and tunnel surfaces extending from the inner inclined surfaces toward the both sides of the first holding portion to define the second groove, wherein boundary surfaces between the inner inclined surfaces and the tunnel surfaces have a curved surface.

* * * * *